June 23, 1959 S. G. CRESSWELL ET AL 2,892,008

DUMMY INNER LEADS IN WAFER STEMS

Filed Oct. 19, 1955

INVENTORS
STEPHEN G. CRESWELL
CHARLES J. SCHNERING
BY
Michael Hertz
ATTORNEY

United States Patent Office 2,892,008
Patented June 23, 1959

2,892,008

DUMMY INNER LEADS IN WAFER STEMS

Stephen G. Cresswell, Mill Hall, and Charles J. Schnering, Lock Haven, Pa., assignors to Sylvania Electric Products Inc., a corporation of Delaware Application October 19, 1955, Serial No. 541,460

2 Claims. (Cl. 174—50.61)

This invention relates to electron discharge devices and in particular to a means and method for achieving dummy lead association with a ceramic support.

Dummy leads in discharge devices such as in radio tubes, are wires or rods inserted in the base of the tube, usually of glass or other ceramic material and which do not penetrate to the exterior to form outside terminals. They do extend up from the base into the tube envelope to form supports for elements within the tube. The leads are purposely made not to extend through to the exterior of the tube to avoid possibility of attachment of conductors to the leads and to reduce capacitances.

In the manufacture of radio tube stems it has been the practice to feed all leads, including dummy leads, into suitably spaced parallel guideways in an upper die member, these leads then passing through the member and into bores in the upper surface of a lower die-member, and on which surface had been preliminarily positioned a short glass cylinder or collet surrounding the bores. Then both die members were rotated before pin pointed gas fires issuing from a number of nozzles arranged arcuately about the collets and the collets were fused around the leads. Next, movement of the die members toward each other formed the fused ceramic into a button or wafer which when cool held all of the leads, both dummy and through leads, in place. Subsequently, if desired, the leads which were to become dummy leads were broken off at the bottom of the stem. In many instances this resulted in cracking of the ceramic adjacent the lead or in breaking the seal between the ceramic and the dummy lead. Moreover, the operation was time consuming or involved the use of cutters or the like to effect the severance of the external portion of the lead from the remainder.

The leads utilized in the manufacture of ceramic based tubes contain a section which is of a special material known as "Dumet" and which comprises a copper clad wire of an alloy or nickel and steel with an intermediate bonding layer of brass, the material having substantially the same coefficient of expansion as glass and the copper coating facilitating proper sealing between lead and glass. Since this clad material is expensive, it is common in the art of tube manufacture to utilize a length of this "Dumet" which is just sufficient to properly seal the lead into the ceramic and to butt weld onto the "Dumet" leads heavier and less expensive and more suitable metals to serve as conductive leads or supports within the tube and as terminal pins outside of the tube.

Fortunately, this tripartite construction of lead lends itself to the process and means employed in this invention to secure dummy leads in the glass or other ceramic as will be made clear in the further consideration of this disclosure.

It is an object of the invention to provide a process and means whereby leads may be associated with ceramic material in such manner as to easily provide for dummy and through leads.

It is a further object of this invention to provide a stem with multipart through leads, some of which are positioned in the stem so that they may be easily snapped off at the stem surface and others of which are placed within the stem to resist separation of the lead.

These and other objects will be made clear upon reading the following specification and claims when taken in conjunction with the accompanying drawings in which:

Figure 1:
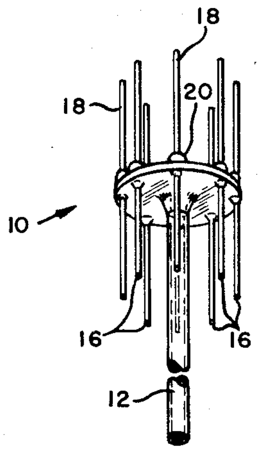
Fig. 1 is a perspective view of a stem with attached exhaust tubulation, showing leads extending into and others through the stem as they would appear immediately after manufacture of the stem.
Figure 2:
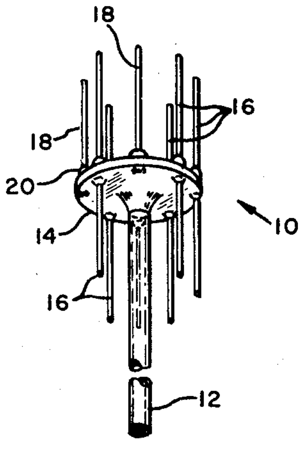
Fig. 2 is a view similar to Fig. 1 but showing the external dummy lead portions removed.
Figure 3:
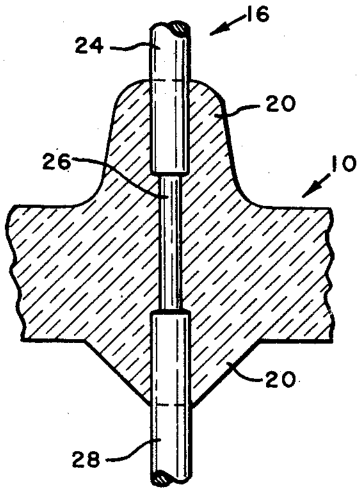
Fig. 3 is an enlarged section of a fragmental portion of the stem showing how a through lead is embedded in the ceramic.
Figure 4:
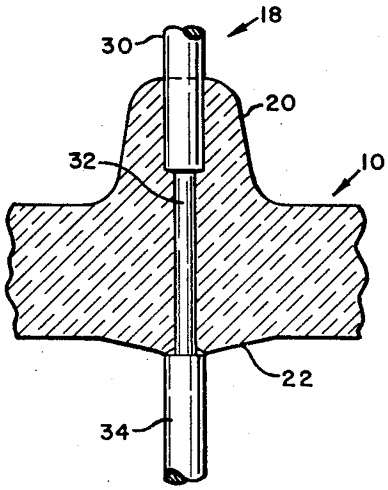
Fig. 4 is a similar section but showing how a dummy lead is embedded in the glass and prior to removal of the external portion of the lead.

Referring to the drawings, at 10 in Figs. 1 and 2 is disclosed a stem and attached exhaust tubulation 12 and which is removed during sealing off of the evacuated radio tube. The stem comprises a button 14 of insulating material such as glass, this button being molded about a number of stem leads 16 having certain dimensions as will be explained and other stem leads 18 having other dimensions. The glass button is molded about the pin leads, so as to form nodules or beads of glass 20, there being as many beads on the upper surface of the stem as there are leads and as many beads on the lower tabulated surface of the stem as there are through leads, these leads surrounding the stem leads. These beads are provided, in conventional stem construction, to reinforce the glass at the places where the stem leads extend through or from the glass and to provide for a better seal between glass and stem.

In the stem of this invention, the lower surface of the stem, which in the finished tube will be the outer surface, is not provided with similar beads around the area of the dummy leads. Instead there is provided a very slight thickening of the glass as illustrated at 22, the purpose being to provide reinforcement of the glass immediately surrounding the portion of the dummy lead 18 to be broken off and to provide a shoulder portion against which an edge of the lower section lead may act in effecting the breaking off of the outer lead section.

The leads 16 and 18 may all be of the same over all length, although that is not necessary. The leads 16 each comprises an electrode support section 24, a thinner "Dumet" section 26, and an outer pin section 28 which may or may not be of the same diameter as the section 24 but is thicker than the "Dumet" section. The sections are butt welded to one another. The "Dumet" section 26 is wholly embedded in the glass with the other lead portions 24 and 28 embedded in the bead portions of the glass. The leads 18 have electrode support sections 30, like the sections 24 and a thinner "Dumet" section 32 which in one form of construction is longer than section 26 and which terminates substantially flush with the lower surface of the thickened portion 22 which thickened portion may have a slight recess leading to the lower end of the "Dumet" section. The dummy lead also has an outer section 34 which is thicker than the "Dumet" section and which may not be of the same diameter as the section 30. Where the leads 16 and 18 were all of the same overall length, the outer section 34 of a dummy lead would be shorter than the outer pin section of a lead 16. While in this specific instance the "Dumet" section is disclosed as longer than "Dumet" portion 26, the principles of the invention would be served even if the sections 32 were shorter or equal in length to section 26, provided the lower end of the section terminated in the lower surface of the button 10. It is obvious as many dummy leads may be incorporated with the stem as may be found desirable.

At any subsequent stage in the manufacture of the radio tube, the sections 34 of the dummy leads may be very easily removed by side thrust action thereon in any direction. The upper shoulder of the thick section will flex about the lower end of thin section 32, abut the glass, and break easily at the juncture with the thinner "Dumet" section.

Having thus described the invention what is claimed is:

1. In the manufacture of stems for radio tubes, the step of sealing in a number of through leads into an insulating support, each lead having a reduced intermediate section and adjoining larger diametered sections buried within the support, sealing in with said leads at least one additional lead with a reduced intermediate area portion, with the juncture of the reduced area portion and a larger diametered portion at a surface of the support, and bending the exposed portion of said additional lead at said surface to break the same away from the reduced intermediate section.

2. A stem for a radio tube comprising an insulating support with a generally planar surface and a boss on said planar surface forming a thickened portion of the support, a recess in said boss, and a lead extending through and beyond both surfaces of the support and through the recessed portion of the boss, said lead having a thin portion sealed to the support and terminating at the level of the outer rim of the recess, said lead also having a thick portion integral with the thin portion and extending from the rim of the recess to beyond the surface.

References Cited in the file of this patent

UNITED STATES PATENTS

| | | |
|---|---|---|
| 2,107,254 | Horn | Feb. 1, 1938 |
| 2,190,788 | Horn | Feb. 20, 1940 |
| 2,291,660 | Spencer | Aug. 4, 1942 |